United States Patent [19]
Alessandro et al.

[11] Patent Number: 6,148,945
[45] Date of Patent: Nov. 21, 2000

[54] STEERING DRIVE AXLE

[75] Inventors: Andreis Alessandro, Mirano; Benvenuto Michele, Mestre, both of Italy

[73] Assignee: Carraro S.p.A., Padua, Italy

[21] Appl. No.: 09/318,748

[22] Filed: May 26, 1999

[30] Foreign Application Priority Data

May 29, 1998 [IT] Italy .................................. PD98A0138

[51] Int. Cl.$^7$ ................................................. B60K 17/30
[52] U.S. Cl. .......................... 180/256; 180/252; 180/253; 180/257; 180/263; 301/124.1; 301/137
[58] Field of Search ..................................... 180/252, 253, 180/256, 257, 263; 301/124.1, 137

[56] References Cited

U.S. PATENT DOCUMENTS

| | | | |
|---|---|---|---|
| 1,034,956 | 8/1912 | Bergman et al. | 180/257 |
| 2,133,652 | 10/1938 | Best | 180/256 |
| 2,871,966 | 2/1959 | Dreltzler | 180/257 |
| 2,913,929 | 11/1959 | Anderson | 475/247 |
| 3,115,205 | 12/1963 | Ewing | 180/252 |
| 3,243,007 | 3/1966 | Berckhan | 180/256 |
| 4,057,120 | 11/1977 | Roethlisberger | 180/263 |
| 4,079,799 | 3/1978 | Swan | 180/263 |
| 4,119,167 | 10/1978 | Yamada et al. | 180/259 |
| 4,258,818 | 3/1981 | Uzu | 180/233 |
| 4,282,949 | 8/1981 | Kopich et al. | 180/252 |
| 4,427,089 | 1/1984 | Peterson | 180/253 |
| 4,697,662 | 10/1987 | Zollmeyer et al. | 180/256 |
| 4,733,744 | 3/1988 | Glaze | 180/256 |

*Primary Examiner*—Brian L. Johnson
*Assistant Examiner*—Deanna L. Draper
*Attorney, Agent, or Firm*—Sughrue, Mion, Zinn, Macpeak & Seas, PLLC

[57] ABSTRACT

In a steering drive axle, particularly for agricultural tractors, the transverse transmission members (16–20) which bring the drive from a central differential (12) to the wheel hubs (13a) comprise a half-shaft portion (18) having a first end connected to a universal joint (17) at the output from the differential (12), and a second end connected to a constant-velocity joint (19) fixed for rotation with a respective hub (13a). The half-shaft portion (18) is mounted for rotating on a support (22) connected (23) to articulated suspension members (14, 15) in a manner such as to support the outer end of the half-shaft portion (18) and the inner end of the constant-velocity joint (19).

7 Claims, 3 Drawing Sheets

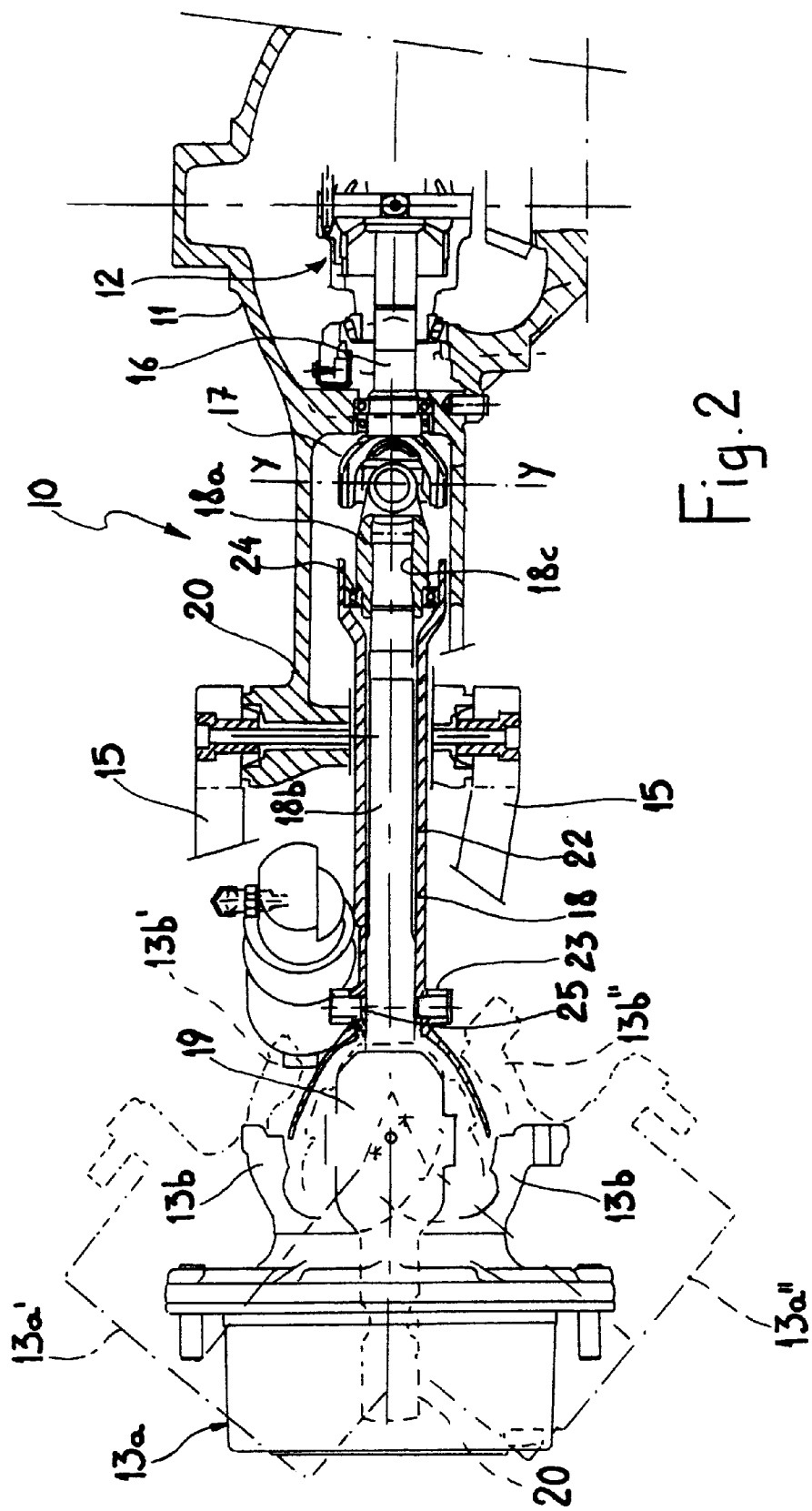

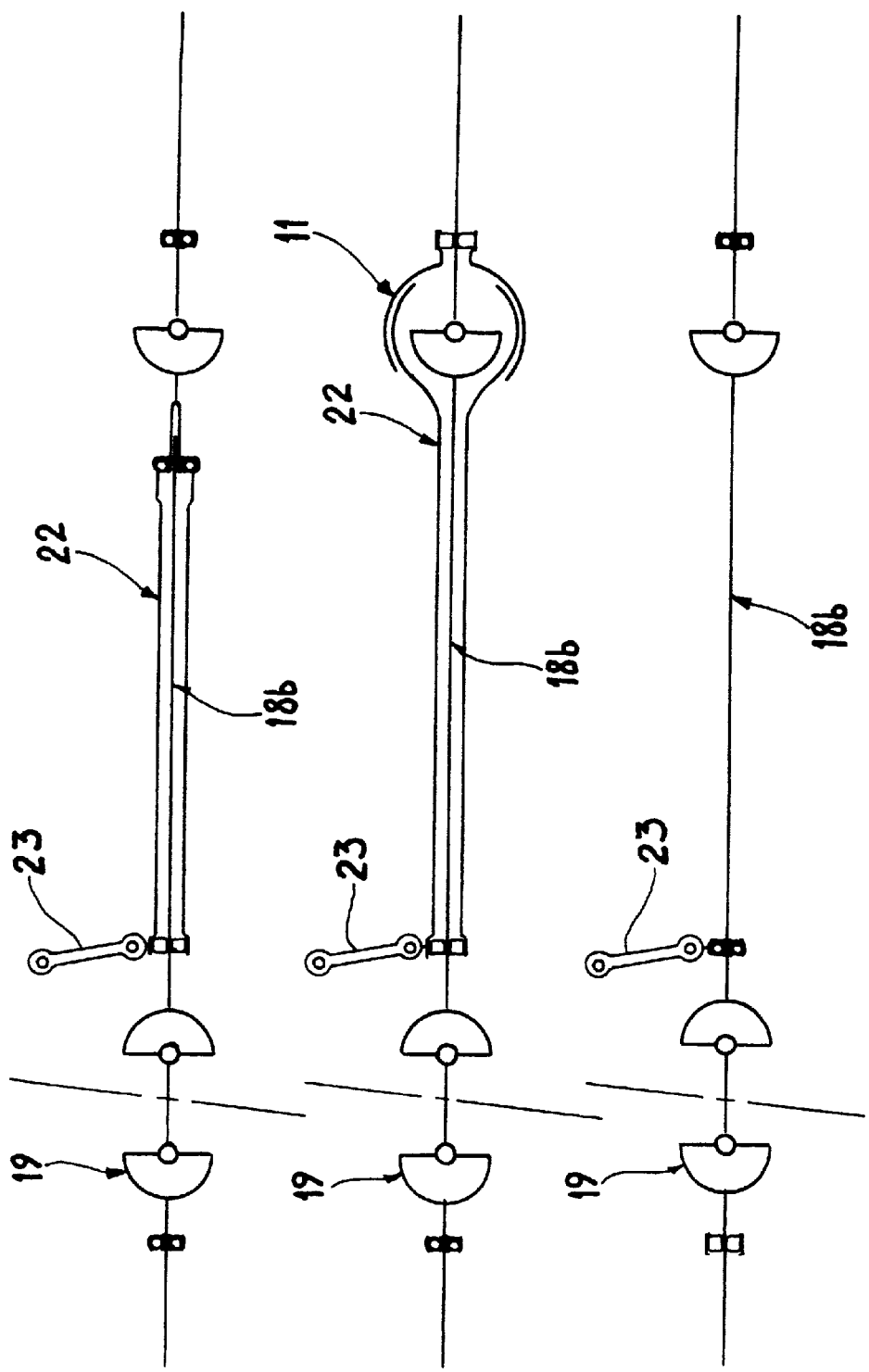

STEERING DRIVE AXLE

BACKGROUND OF THE INVENTION

The present invention relates to a steering drive axle, particularly for agricultural tractors and earth-moving machines, of the type comprising:

a central oscillating body containing a differential unit, articulated suspension means for supporting respective wheel hubs for pivoting in a transverse vertical plane, and transverse transmission members for transmitting the rotary drive from the differential unit to the wheel hubs, the transverse transmission members being articulated in order to follow the vertical pivoting and the steering movement of the hubs.

An axle of this type is described in the Applicant's Italian patent application No. PD96A000120.

The transverse transmission members usually comprise an articulated half-shaft, typically split up into four successive portions connected by joints. More precisely, a first, innermost portion takes the drive from the differential situated in the central portion of the axle and transfers it, by means of a first universal joint, to a second half-shaft portion which is connected, by means of a second universal joint, to a third half-shaft portion which introduces the drive to a double universal constant-velocity joint; the third portion is supported for rotation by the hub support. The fourth, outermost portion extends from the outer side of the constant-velocity joint and rotates the hub.

SUMMARY OF THE INVENTION

The object of the present invention is to provide an improved steering drive axle in which the transverse transmission units are constituted by a smaller number of half-shaft portions and respective connecting joints which, as is well known, are expensive and bulky. In particular, it is desired to eliminate one of the two intermediate half-shaft portions (that is, the second or third portion mentioned above) and the respective universal joint. In this case, however, there is a problem both in providing adequate support for the inner end of the double universal constant-velocity joint, and in producing an articulated transmission system which allows the hub to execute substantial steering angles. The replacement of the double universal constant-velocity joint with a self-supporting joint the cups of which engage one another by means of tubular sleeves would solve the problem of the support of the joint at its inner end but would in any case constitute a semi-rigid system which is suitable for certain applications but not for agricultural tractors which require steering angles of at least 55 degrees.

In order to solve these problems, achieving the above-mentioned object as well as further advantages which will be understood better from the following, the present invention proposes the provision of a steering drive axle having the characteristics set out in the introductory portion of the description and characterised in that the transverse transmission members comprise a half-shaft portion having a first end connected to a universal joint at the output of the central differential unit and a second end connected to a double universal constant-velocity joint fixed for rotation with a respective hub, the said half-shaft portion being supported for rotation by a stationary support means connected to the articulated suspension means in a manner such as to support the outer end of the half-shaft portion and the inner end of the joint.

This configuration eliminates a half-shaft portion and one of the respective universal joints, supporting the inner end of the double universal constant-velocity joint and enabling the steering angles required for the wheels of an agricultural tractor or other equivalent machines to be achieved.

The means for supporting the above-mentioned half-shaft portion is preferably constituted by a rigid tubular element which covers the half-shaft, protecting it from any knocks or other possible damage.

BRIEF DESCRIPTION OF THE INVENTION

The present invention will be described with reference to the appended drawings, provided purely by way of non-limiting example, in which identical or similar parts correspond to the same reference numerals in the various views, and in which:

FIG. 1 is a partial, vertically sectioned view of the central portion and one of the two side portions of an axle according to the present invention, FIG. 2 is a horizontal section taken on the line II—II of FIG. 1, FIGS. 3 to 5 show schematically three different methods of supporting the intermediate half-shaft.

DETAILED DESCRIPTION OF THE INVENTION

Figure 1:
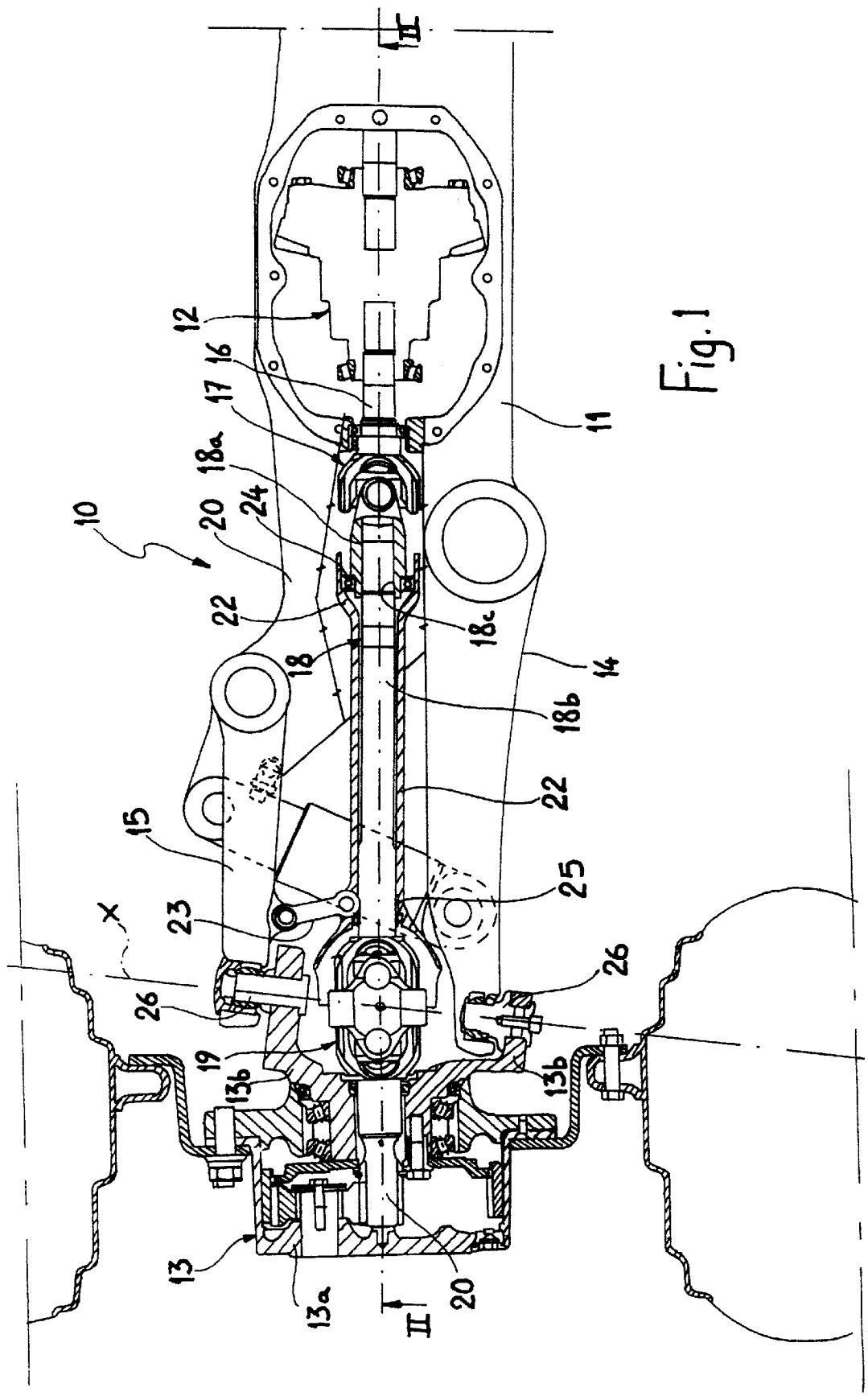

With reference initially to FIG. 1, an axle formed in accordance with the present invention is generally indicated 10; for simplicity, the appended drawings show only the central portion of the axle and one of its two side portions on the ends of which respective wheel hubs are mounted.

The axle 10 comprises a central body 11 defining a closed box-like structure housing a differential, schematically indicated 12, which receives the drive from a longitudinal transmission shaft (not shown) and distributes it to the wheel hubs 13a by means of a pair of transverse half-shafts suitably articulated to allow the hubs 13a to perform a rotary steering movement about respective axes x which are inclined slightly to the vertical (FIG. 1), and a general pivoting movement about respective horizontal longitudinal axes y (FIG. 2). In order also to allow the supports 13b of the hubs 13a, and hence the hubs, to perform this pivoting movement in the vertical transverse plane, each support 13b is connected to the central body 11 by means of articulated suspension arms 14, 15. This type of articulated connection, which does not fall within the scope of the present invention, will not be described herein; for a detailed discussion thereof, reference should be made to Italian patent application No. PD96A000120.

The terms "inner", "outer", "longitudinal" and "transverse" as used herein should be interpreted with reference to the longitudinal axis of the vehicle, unless indicated otherwise.

With reference to FIG. 1 in particular, in order to rotate the hub 13a, a first inner portion 16 of a transverse drive-output half-shaft is fixed to the planetary gears of the differential 12. The first half-shaft portion 16 is connected, by means of a universal joint 17, to a second, intermediate half-shaft portion 18; the outer end of this second portion is connected, by means of a double universal constant-velocity joint, generally indicated 19, to a third, end half-shaft portion 20 which extends through the support 13b of the hub and rotates the hub 13a in conventional manner.

The hub support 13b is mounted on the suspension arms 14 and 15 for pivoting about the inclined steering axis x by means of swivel pins 26, defining, together with a rigid body 21 fixed to the central body 11, an articulated-quadrilateral kinematic mechanism.

At its inner end, the intermediate half-shaft portion 18 is mounted for pivoting on the horizontal longitudinal spider axis y of the universal joint 17.

According to the present invention, the intermediate half-shaft portion 18 is supported for rotation by a support means 22 which, in the preferred embodiment shown in the drawings, is constituted by a rigid tubular element which encloses most of the half-shaft portion 18 and which extends from the inner end of the portion 18 to the region of its outer end in the vicinity of the constant-velocity joint 19.

The support element 22 is articulated to one of the two arms 14, 15 (in this embodiment to the upper arm 15) by means of a link rod 23; by virtue of this configuration, the intermediate half-shaft portion 18 follows the movements of the articulated arms 14, 15 which pivot in the vertical plane.

As can be appreciated, the element 22 thus also forms a support for the inner end of the universal joint 19 which, in the absence of an adequate support, would tend to drop. Since the half-shaft rotates, between the intermediate portion 18 and the support element 22, there are interposed a first, ball bearing 24, in the vicinity of the inner end of the element 22, and a second support such as, for example, a roller bearing 25, which supports the element 22 for rotation in the vicinity of the outer end thereof.

Naturally, the support element 22 may also adopt forms other than the preferred embodiment described and illustrated herein. For example, in an alternative embodiment, not shown, the support element may be formed by a linear, rigid element which extends parallel to the intermediate half-shaft 18, supporting it in equivalent manner. However, the form shown, of a tubular housing which surrounds the intermediate portion 18, is particularly advantageous since it forms a stationary protection which protects the half-shaft from any knocks or damage due to accidental contact with external bodies such as stones, etc. and, at the same time, protects the user from contact with rotating members.

In another alternative embodiment (FIG. 4), the inner end of the support element 22 may be articulated or mounted pivotably in some manner on the box-like casing of the central body 11, coaxially with the longitudinal spider axis y of the universal joint 17 and will thus in any case have the ability to pivot in the transverse vertical plane. With reference to FIGS. 2 and 3, given that, during the steering movement of the hub 13*a* and of its support 13*b* (as indicated in broken outline by 13*a*', 13*a*", 13*b*', 13*b*") the constant-velocity joint 19 is subject to a transverse translational movement, the intermediate half-shaft portion 18 is advantageously split up into two portions 18*a*, 18*b*, slidable relative to one another and fixed to the universal joint 17 and to the constant-velocity joint 19, respectively. This coupling can take up the transverse movements transmitted to the outer portion 18*b* of the intermediate half-shaft 18 by the constant-velocity joint 19. The two portions 18*a*, 18*b* are preferably coupled for rotation by means of transverse splines 18*c* which permit relative transverse sliding thereof.

The invention is not intended to be limited to the embodiment described and illustrated herein, which should be considered as an embodiment of the axle which may, however, be modified with regard to the shape and arrangement of parts and to structural and functional details. For example, in a further embodiment of the invention, the means 22 for supporting the half-shaft could be formed by a simple rolling bearing, of which the stationary outer ring would be suitably connected (FIG. 5) to one of the suspension arms 14, 15 and the inner ring would be fixed to the half-shaft 18*b*. The outer portion of the double universal joint would thus have to be rendered axially slidable.

What is claimed is:

1. A steering drive axle for agricultural tractors, comprising:

a central body (11) containing a differential unit (12), articulated suspension means (14, 15) for supporting respective wheel hubs (13*a*) for pivoting in a transverse vertical plane, and transverse transmission members (16–20) for transmitting the rotary drive from the differential unit (12) to the wheel hubs, the transverse transmission members being articulated in order to follow the vertical pivoting and the steering movement of the hubs, characterised in that the transverse transmission members (16–20) comprise a half-shaft portion (18) having a first end connected to a universal joint (17) at the output of the central differential unit and a second end connected to a constant-velocity joint (19) with a double universal joint, fixed for rotation with a respective hub (13*a*), the said half-shaft portion (18) being mounted for rotation on a support means (22) connected (23) to the articulated suspension means (14, 15) in a manner such as to support the outer end of the half-shaft portion (18) and the inner end of the constant-velocity joint (19), wherein the connection (23) of the support means (22) to the articulated suspension means (14,15) is an articulated connection.

2. An axle according to claim 1, characterised in that the support means (22) is an elongate, rigid element which extends between the opposite ends of the half-shaft portion (18), and in that respective rolling bearings (24, 25) are provided in the vicinity of the said ends.

3. An axle according to claim 2, characterised in that the support means is a tubular element which encloses most of the half-shaft portion (18).

4. An axle according to claim 3, characterised in that the intermediate half-shaft portion (18) is split up into two portions (18*a*, 18*b*) slidable relative to one another and fixed to the universal joint (17) and to the constant-velocity joint (19), respectively.

5. An axle according to claim 4, characterised in that the portions (18*a*, 18*b*) are coupled for rotation by means of transverse splines (18*c*).

6. An axle according to claim 3, characterised in that the tubular element (22) is mounted for pivoting about a horizontal articulation axis (y) coinciding with one of the swivel axes of the spider of the universal joint (17).

7. An axle according to claim 1, characterised in that the articulated connection is formed by means of a link rod (23) having a first end articulated to the support means (22) and a second end articulated to a transverse arm (14, 15) forming part of the articulated suspension means.

* * * * *